May 21, 1963
J. H. GAINS
3,090,355
CALF FEEDER
Filed Sept. 15, 1961
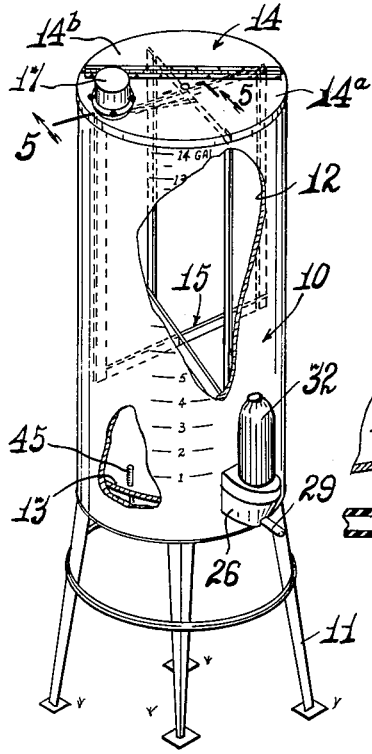
FIG. 1
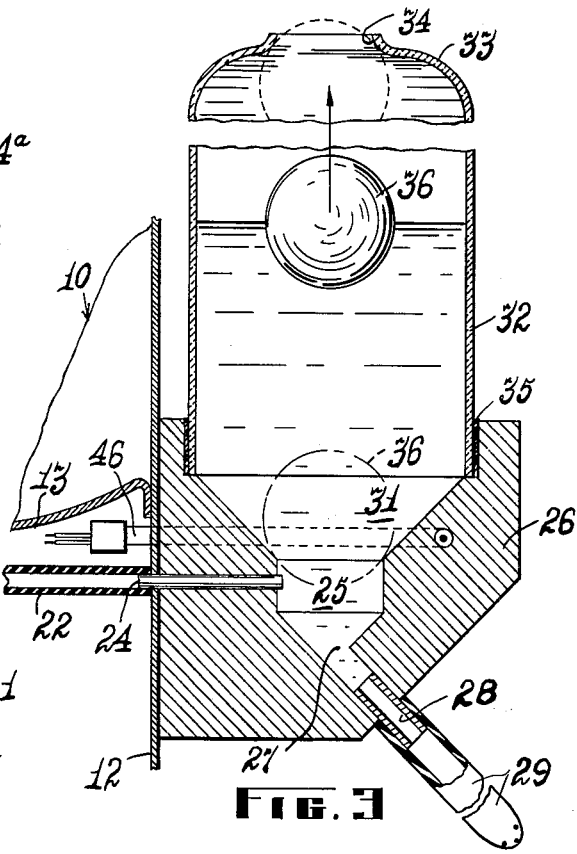
FIG. 3
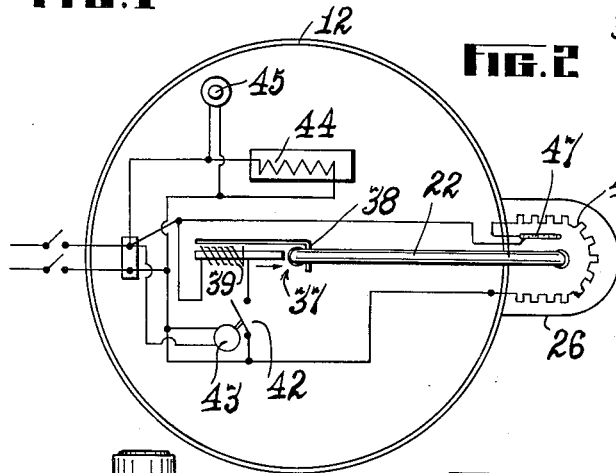
FIG. 2
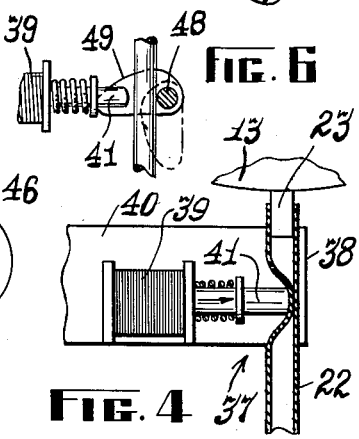
FIG. 6
FIG. 4
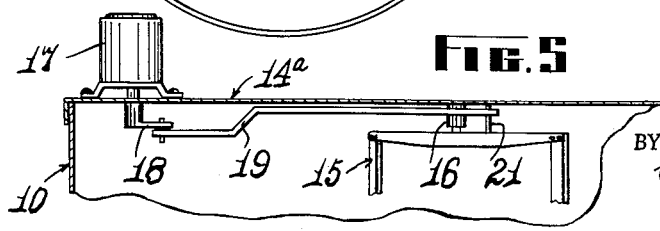
FIG. 5
INVENTOR.
JEAN H. GAINS
BY Charles H. Redman
Attorney.

United States Patent Office

3,090,355
Patented May 21, 1963

3,090,355
CALF FEEDER
Jean H. Gains, 22 9th St., Geneva, Ill.
Filed Sept. 15, 1961, Ser. No. 138,418
10 Claims. (Cl. 119—71)

The invention relates to improvements in feeding apparatus and is more particularly concerned with the construction, assembly and operation of an automatic apparatus for use in feeding calves and/or other animals before they are old enough to be weaned. The feeding of such animals requires that only specific quantities of a suitable formula of milk and/or other nutritional elements be made available at any one time and that it be maintained at predetermined temperatures. The apparatus of the present invention is constructed to maintain a large volume of feed solution at a predetermined temperature and to agitate same continuously so as to avoid a settling out of the solids therein. Also, the apparatus includes novel means to permit automatically measured quantities of the feed solution to be made available in a feeding device for consumption at controllable time intervals.

It is therefore an object of the invention to provide a novel feeding apparatus.

Another object is to provide an animal feeding apparatus with a novel feeding device adapted to contain measured quantities of feed solution for periodic feeding.

Another object is to provide novel means to control periodic flow of feed solution from a storage supply source to the measuring and feeding device.

Another object is to provide an improved automatic feeding apparatus which is not expensive to construct or costly to operate, will require only minimum care and attention, is entirely automatic in its operation, and is operable to make available at controlled intervals predetermined quantities of feed solution.

With the foregoing and such other objects in view, which will appear as the description proceeds, the invention consists of certain novel features of construction, arrangement and combination of parts hereinafter fully described, illustrated in the accompanying drawings, and particularly pointed out in the appended claims, it being understood that various changes in form, proportion, size and minor details of the structure may be made without departing from the spirit of the invention.

Referring to the drawings in which the same characters of reference are employed to identify corresponding parts:

FIG. 1 is a perspective view of a solution feeding apparatus embodying features of the invention, showing portions of the supply tank broken away to illustrate details thereof;

FIG. 2 is an enlarged schematic bottom plan view of the device, diagrammatically showing the electrical components and wiring thereof;

FIG. 3 is an enlarged vertical sectional view of the solution measuring and feeding device;

FIG. 4 is an enlarged detail view of the automatic shutoff for the supply tube leading from the supply tank to the feed measuring device, showing the flow line in section and pinched;

FIG. 5 is an enlarged fragmentary detail sectional view taken substantially on line 5—5 of FIG. 1, showing the agitator drive; and, FIG. 6 is a fragmentary detail view of a modified form of shut-off control.

Referring to the exemplary disclosure of the invention shown in the accompanying drawings, a quantity of feed solution is contained in a storage or supply tank 10 which is suitably supported at an elevation from ground level, as by legs 11, and which includes a cylindrical wall 12, a bottom wall 13 and a removable cover 14. The cover preferably is made of two hingedly connected portions 14a and 14b adapting the portion 14b to be raised for purposes of filling the tank or making an examination of its contents. Preferably, an agitator comprised of a vertically disposed rectangular frame, such as the agitator shown at 15, is arranged within tank 10 and is journalled at 16 in the cover portion 14a so as to maintain the solution sufficiently agitated to prevent settling of the solids therein. Drive means for the agitator may be provided in the form of a motor 17 carrying a crank-arm 18 mounting one end of a link 19, the other end of which is connected, as at 21, to the agitator closely adjacent to journal 16. The crank-arm-link assembly is such as to impart oscillatable rotation to agitator 15 through about one-fourth of a revolution for each revolution of crank-arm 18. Obviously, agitator means other than that illustrated may be utilized.

A flow tube 22, preferably of suitable plastic or other resiliently compressible material, is connected at one of its ends to a nipple 23 (FIG. 4) extending through tank bottom 13. Its other end is connected to a nipple 24 (FIG. 3) mounted in flow communication with a circular cavity 25 in a body 26 secured in any suitable manner to the outside of supply tank, at a level below bottom wall 13 so as to insure gravity flow of feed solution from said tank into said cavity. As best shown in FIG. 3, the cavity 25 terminates at its lower end in a discharge port 27 into which is fitted firmly, a fitting 28 carrying a teat 29. Preferably teat 29 is disposed in an angular position to enable it to be mouthed by an animal.

The upper region of cavity 25 flares outwardly, as at 31, and receives therein the open bottom end of a cylinder 32 having its tip margin rolled or otherwise turned radially inward to form a top wall 33 having a central externally flanged opening 34 therein. Cylinder 32 preferably is fabricated from clear plastic material and is fitted tightly into cavity 25, suitable packing 35 being provided, if required, to afford a leak proof joint. Under conditions of non-use, fluid solution flowing into cavity 25 rises in cylinder 32 until a ball float 36 in said cylinder is carried into sealing engagement with the perimeter of opening 34, as illustrated in dotted lines in FIG. 3. The filled capacity of cylinder 32 comprises a volume responding to that intended to be obtained by an animal at one feeding. Otherwise stated, when the filled container is drained or substantially drained of fluid solution by an animal feeding at teat 29, the animal instinctively stops feeding and leaves the area of the apparatus, but should the animal continue feeding at teat 29 the float 36 will seat over circular cavity 25 (broken lines in FIG. 3) and prevent sucking of air through teat 29.

Control means is provided to control the flow of solution into cylinder 32 and, as best shown in FIGS. 2 and 4, this may comprise a time controlled pinch valve generally indicated at 37. More particularly, the tube 22 leaving the bottom of tank 10, lies in close proximity with a backing plate 38 secured to the tank bottom wall. A solenoid 39 is carried by a side extension 40 of said plate in a manner to locate its core 41 in diametric opposition to said plate so as to normally impinge on the tube and effectively pinch the same (FIG. 4) with sufficient firmness to shut off the flow of fluid therethrough. The valve control also includes a normally open switch 42 operable, at predetermined intervals as determined by the setting of an electric timer 43, to close the circuit to solenoid 39 and withdraw its core from tube engagement. When this occurs, fluid is free to flow into cavity 25 to refill cylinder 32.

In order to maintain the fluid solution in tank 10 at a predetermined temperature at all times, an electrical heating element 44 (FIG. 2) is mounted on the under side of tank bottom wall 13, the operation of which may be controlled by a thermostat switch 45 projecting into said tank. Also, a Calrod element 46 is embedded in body 26 to maintain said body at a predetermined temperature so as to retain the requisite temperature of the fluid in cavity 25 and cylinder 32, said Calrod being controlled by a thermostat switch 47.

The feeding apparatus is such that the fluid solution in tank 10 is agitated at all times and said solution, as well as any contained in the feed cavity 25 and cylinder 32, is maintained at the requisite temperature. Depending on the setting of the timing control and size of cylinder 32, any desired quantity of fluid can be made available to the animal at predetermined intervals.

For purposes of cleaning the apparatus it may be desirable to retain tube 22 open to permit flushing of tank 10. In such event the tube 22 may be associated with a manually rotatable rod 48 (FIG. 6) having an eccentric 49 thereon movable from the ineffective position illustrated in dotted lines into the full line position shown, where it comprises an abutment for the solenoid core 41 and prevents it from pinching off said tube.

Inasmuch as many possible embodiments may be made in the invention, and as many changes might be made in the embodiments above set forth, it is to be understood that all matters hereinbefore set forth or shown in the accompanying drawings are to be interpreted as illustrative and not in a limiting sense.

What I claim and desire to secure by Letters Patent of the United States is:

1. In automatic fluid feeding apparatus, a supply tank, an outlet at the bottom wall of said tank, a conduit in flow communication with said outlet, a time controlled valve adapted to normally close said conduit, a container to receive fluid flowing through said conduit, a vent in said container, a float valve cooperating with said vent to close the container when it is filled to capacity, a teat simulating member in communication with said container and extending outwardly therefrom, and electrical heating elements operable to maintain a predetermined temperature in the fluid in said tank and in said container.

2. The automatic feeding apparatus recited in claim 1, in which agitator means is provided in said tank.

3. The automatic feeding apparatus recited in claim 1, in which the time controlled valve and heating element for the tank are carried on the outside of the bottom wall of said tank.

4. The automatic feeding apparatus recited in claim 1, in which the container comprises a base secured to the outside wall of the tank and a transparent shell mounted in said base.

5. The automatic feeding apparatus recited in claim 4, in which the heating element for the fluid in the container is embedded in the base.

6. In automatic fluid feeding apparatus, a supply tank having an outlet at the bottom thereof, a conduit in flow communication with said outlet, valve means adapted to normally close said conduit, a container to receive fluid flowing through said conduit, a vent in said container, a valve element cooperating with said vent to close same when the container is filled to capacity, a teat simulating member in communication with said container and extending outwardly therefrom, and electrical heating elements operable to maintain a predetermined temperature in the fluid in said tank and in said container.

7. In automatic fluid feeding apparatus, a fluid supply source, a conduit in flow communication with said source, time controlled means adapted to normally close said conduit, a container to receive fluid flowing through said conduit, a vent in said container, a valve element cooperating with said vent to stop the flow of fluid to the container when it is filled to capacity, a teat simulating member in communication with said container and extending outwardly therefrom, and thermostatically controlled electrical heating elements operable to maintain a predetermined fluid temperature.

8. In automatic fluid feeding apparatus, a fluid supply source, a resiliently compressible conduit in flow communication with said outlet, a time controlled element adapted to normally compress said conduit to stop the flow of fluid therethrough, a container to receive liquid flowing through said conduit, a vent in said container, valve means cooperating with said vent to close the container when it is filled to capacity, and a teat simulating member in communication with said container and extending outwardly therefrom.

9. In automatic fluid feeding apparatus, a tank including a bottom wall adapted to contain a supply of fluid, an outlet in said bottom wall, a member having a cavity therein secured to said tank in a plane below said bottom wall, a tube connecting said outlet with said cavity, at least a portion of said tube being resiliently compressible, an electrically controlled element operable to compress said tube portion to stop the flow of fluid from the tank to said cavity, a shell seated in said cavity and defining therewith a container for fluid, a vent in said shell, a float in said shell operable to close said vent when fluid in said shell reaches a predetermined level, an outlet in said member and in communication with said cavity, and a teat simulating member connected to said cavity outlet.

10. In automatic fluid feeding apparatus, a tank including a bottom wall and adapted to contain a supply of fluid, an outlet in said bottom wall, a member having a cavity therein secured to said tank in a plane below said bottom wall, a resiliently compressible tube connecting said outlet with said cavity, time controlled means operable to compress said tube to stop the flow of fluid from the tank to said cavity, a shell defining with said cavity a container for fluid, a vent in said shell, a float in said shell for closing said vent when fluid in said container reaches a predetermined level, an outlet in said member and in communication with said cavity, and a teat simulating member connected to said cavity outlet.

References Cited in the file of this patent

UNITED STATES PATENTS

| | | |
|---|---|---|
| 274,379 | Reed | Mar. 20, 1883 |
| 739,150 | Canon | Sept. 15, 1903 |
| 2,674,435 | Angell | Apr. 6, 1954 |
| 2,678,026 | Rue et al. | May 11, 1954 |
| 2,782,760 | Wolfe | Feb. 26, 1957 |
| 3,037,481 | Kloss | June 5, 1962 |

FOREIGN PATENTS

| | | |
|---|---|---|
| 703,037 | Great Britain | Jan. 27, 1954 |